United States Patent

McKenna

[11] Patent Number: 5,623,868
[45] Date of Patent: Apr. 29, 1997

[54] CARROT PROCESSING MACHINES

[75] Inventor: William McKenna, Marshland St James, United Kingdom

[73] Assignee: Fenland Fruits Limited, Cambridge, Great Britain

[21] Appl. No.: 401,963

[22] Filed: Mar. 10, 1995

[30] Foreign Application Priority Data

Sep. 27, 1994 [GB] United Kingdom .................. 9419470

[51] Int. Cl.⁶ ................................................ A23N 15/00
[52] U.S. Cl. .................................. 99/636; 99/637; 99/643
[58] Field of Search ............................. 99/635, 636, 637, 99/639, 643; 198/836.2, 396

[56] References Cited

U.S. PATENT DOCUMENTS

| | | | |
|---|---|---|---|
| 3,621,900 | 11/1971 | Rood | 99/636 |
| 3,738,258 | 6/1973 | Goodale | 99/643 |
| 3,838,766 | 10/1974 | Wagers, Jr. et al. | 198/397 |
| 3,845,705 | 11/1974 | Chapman | 99/643 |
| 4,367,675 | 1/1983 | Boots | 99/643 |
| 4,831,925 | 5/1989 | Zanetti | 99/643 |
| 5,320,033 | 6/1994 | Chapman et al. | 99/643 |

*Primary Examiner*—Reginald Alexander
*Attorney, Agent, or Firm*—Lee, Mann, Smith, McWilliam, Sweeney & Ohlson

[57] ABSTRACT

A carrot processing machine having an accumulation well, an elevating conveyor (16), and sensing means (18, 20, 22, 24). Carrots are delivered into the well by a delivery conveyor and a constant head of carrots maintained by signals derived from a height sensing means controlling the delivery conveyor. The elevating conveyor (16) is provided with a series of pockets (28, 30, 32, 34) into which the carrots are urged by vibration of the well. Cutting blades (124, 126, 128, 130) are provided further along the conveyor for topping and tailing the carrots and segmenting them into short lengths. Endwise movement of the carrots (in their pockets) is achieved by engagement between transversely extending endless belts and the carrots in the conveyor pockets or by tilting the conveyor.

15 Claims, 6 Drawing Sheets

CARROT PROCESSING MACHINES

FIELD OF THE INVENTION

This invention concerns carrot processing machines by which carrots are topped and cut to length.

BACKGROUND OF THE INVENTION

Machines for topping harvested carrots are known in which harvested carrots have been delivered to an accumulation well from which the carrots are elevated by means of an elevating conveyor to an upper position where the elevating conveyor discharges the carrots onto a pocket conveyor, the carrots being constrained to lie generally transverse to the direction of movement of the pocket conveyor by rotary brushes located immediately thereabove, which urge the carrots to occupy elongate pockets arranged across the width of the conveyor. The carrots are then shuttled laterally first in one direction and then in the other by means of transversely extending drive belts one of which travels from left to right and the other of which travels from right to left, the pocket walls being cut away at opposite ends to accommodate a rotary knife or the like so that when the carrots are all located to the right hand ends of the pockets it is the right hand ends of the carrot which are severed by the cutters and when the carrots have been transferred to the left hand ends of the pockets it is the left hand ends of the carrots which are severed.

The topped and tailed ends of the carrots are separated from the central sections which latter are then supplied to an output conveyor.

Historically the cutting of the carrot has occurred on the return path of the pocket conveyor and to this end a cover or guard is provided around the conveyor roller where the conveyor direction changes and a platform is provided on the underside spaced only a very small distance from the underside of the conveyor pockets so that the carrots are prevented from falling out of the pockets and tend to roll within the pockets as they engage the platform and are moved thereacross by the movement of the inverted pocket conveyor. The transversely extending drive belts which engage the carrots and move them from left to right and right to left respectively are located on the platform.

It is an object of the present invention to provide improvements to such a machine which hereinafter will be referred to as a carrot processing machine as aforesaid.

SUMMARY OF THE INVENTION

According to one aspect of the present invention in a carrot processing machine as aforesaid, the elevating conveyor is integrated with the pocket conveyor so that it is the latter which picks up the carrots from the accumulation well and transfers them to the raised position within the machine. By integrating the two conveyors there is no need to discharge carrots from one conveyor to another.

In a particularly preferred arrangement the pocket conveyor forms one wall of the accumulation well and extends from the base of the well at an angle to the horizontal so that the accumulation of carrots in the well tend to become aligned by the movement of the pockets relative to the mass of carrots, the pockets in the conveyor become occupied by the carrots at an early stage and very few carrots are carried out of the well other than in the pockets. This simplifies the whole operation and reduces the tendency to jamming as a result of an accumulation of carrots at a later stage on the pocket conveyor where the latter traverses in a generally horizontal direction across the machine.

According to another preferred feature of the invention at least one rotating brush is located above, so as to extend across, the elevating section of the pocket conveyor so that carrots are constrained to lie in the pockets and are aligned therewith. Any surplus carrots carried by the conveyor and lodged between carrots within the pockets will be removed by the action of the brush.

Typically the accumulation well is typically supplied with carrots by a conveyor and the speed of operation and the delivery of carrots to the well is preferably controlled by height sensing means associated with the well to slow the delivery conveyor down and even arrest the operation of the delivery conveyor if the accumulation of carrots in the well exceeds a given height and to restart or accelerate the delivery conveyor if the quantity of carrots in the well drops below a given height.

In this way a generally constant loading of the pocket conveyor is achieved and virtually 100% occupancy of the pockets can be obtained improving the throughput of the machine significantly.

A further advantage obtained by integrating the elevating conveyor with the pocket conveyor lies in the speed at which the machine can be operated. Hitherto the separate elevating conveyor has been used to control the delivery of carrots to the pocket conveyor. Clearly the rate at which such a mechanism can operate is very unpredictable and although it has been proposed to use a pocket-type conveyor for the elevating conveyor, this has in fact exacerbated the problem since the efficiency of the elevating conveyor has been determined by the random alignment of carrots within the accumulation well with the pockets of the conveyor whereas the efficiency of filling the pockets in the pocket conveyor feeding the cutter has been dependent upon the transfer efficiency of the elevating conveyor to the horizontal pocket conveyor. The two efficiencies are unrelated and the throughput of the machine in fact is governed by whichever for the time being is the lower of the two transfer efficiencies.

It was assumed that by using pockets or slots on the separate elevating conveyor the alignment of the carrots on the elevating conveyor will effect a reliable and predictable transfer from the elevating conveyor to the pocket conveyor leading to the cutters. In practice this has demonstrably not occurred.

By substituting a single unitary pocket conveyor to serve both as the elevating and the horizontal pocket conveyors of the earlier machine, the second transfer has been eliminated and throughput rates of between 4 and 6 times the throughput rate of the unmodified machine have been achieved.

Clearly the pick-up efficiency of the pocket conveyor from the accumulation well is greatly assisted if the carrots in the well are all generally aligned with the pockets. According therefore to a further aspect of the invention, alignment means is provided upstream of the exit point of the delivery conveyor to the machine so that carrots entering the well tend all to be generally aligned transversely to the direction of movement of the pocket conveyor and therefore generally in line with the pockets extending across the elevating section of the pocket conveyor.

This may be achieved by using a delivery conveyor having pockets which are generally aligned with the direction of movement of the delivery conveyor (if the latter delivers carrots transversely to the direction of movement of the pocket conveyor) or pockets which extend generally transversely across the delivery conveyor, (if the latter delivers carrots to the accumulation well and the elevating section of the integral pocket conveyor generally in line with the direction of movement thereof).

Rotary brushes located above the delivery conveyor assist in retaining the carrots within the pockets and in the correct and desired alignment.

According to another feature of the invention, the accumulation well associated with the elevating section of the integral pocket conveyor may include at least one vibratory element and vibratory drive associated therewith. The latter may comprise a rotary cam, and the vibratory element and hinged plate, and the cam acts on the rear face of the hinged plate the plate being periodically angularly deflected through a few degrees as a result of each cam impact therewith. Alternatively an electromagnetic or pneumatic drive may be used with appropriate valve means or switch means to obtain the repetitive action of the drive.

The frequency of the vibration may be adjustable. Adjustment may be manual or automatic and may be as a result of feedback from the height or weight of carrot waiting to be collected by the elevating section of the pocket conveyor.

Clearly the throughput of the machine at least in part will be determined by the efficiency of filling the pockets of the elevating section of the pocket conveyor. According therefore to a further preferred feature of the invention, sensor means is provided across the width of the pocket conveyor either in the elevating section or along the horizontal section thereof, one sensor for each pocket across the width of the conveyor and signals are generated depending on the presence or absence of a carrot in each pocket to enable an occupancy percentage to be determined over a given sampling period. The mode of operation, speed of elevating conveyor, vibration of vibratory element within the accumulation well and/or the delivery speed of the delivery conveyor can all be adjusted by means of a control centre supplied with signals indicative of the occupancy percentage of filled pockets. In this way the operation of the machine can be adjusted so as to obtain optimal throughput of carrots.

Whilst the topping and tailing of a carrot is a primary function of a machine as aforesaid, a secondary function involves the cutting of each topped length of carrot into a number of segments of equal size. This is achieved by arranging a corresponding plurality of cutting blades across each of the pockets, with the space between adjacent cutters corresponding to the short lengths of carrot required and the walls of the pockets are cut away in alignment with all of the cutters so as to allow the pocket walls to pass between the cutter blades.

The cutting means for severing the unwanted ends of the carrots and for cutting the carrots into multiple pieces may take any convenient form but preferably comprise rotary blades having a saw tooth edge or water jets.

Where water jets are to be used for cutting, the pocket conveyor is itself preferably formed from an open weave lattice structure at least in alignment with the water jets so as to allow water to penetrate through the conveyor into a recovery manifold located therebelow. It will be appreciated that water for cutting is preferably recycled, after filtration to remove the vegetable matter cut away from the carrots during the topping and/or cutting process.

Where rotary saw blades are involved, the latter may be positioned so that the saw blade teeth are just clear of the base of each pocket so that at least the base of each pocket can be continuous across the width of the conveyor.

In an alternative arrangement in which the pocket conveyor is formed by a plurality of transversely spaced endless bands, and the pockets are formed by a plurality of upstanding fingers arranged in transversely extending lines across the width of the conveyor, the cutting means can extend between the bands and in addition to rotary saw tooth blades and water jets as aforesaid, bandsaws or oscillating saw blades may be employed.

A machine in which the cutting is achieved using water jets is of particular application where it is desired to be able to alter the end product from the machine quickly and with minimum fuss. Thus for example, a machine may be required to produce elongate carrot lengths of standard size up to a certain tonnage and thereafter segmented carrots to a certain tonnage and thereafter a differently sized segment of carrot to a given tonnage. By arranging a large number of jets across the width of a suitably designed pocket conveyor (so that the water incident thereon can pass therethrough), and by providing valve means for each of the water jets each separately controllable so as to determine which of the jets is operational and which is not, so carrots can first of all be topped and tailed using selected pairs of water jets, the cut lengths of carrot may be segmented by operating additional ones of the jets and the segment sizes can be altered by varying the spacing between the selected jets so as to either halve or quarter or otherwise divide each of the standard lengths of carrot into a number of sections.

The advantage of water jet cutting is that the jet can be made very small in cross section so that the vegetable matter which is removed by the action of cutting is minimised. In any case whatever material is removed by the water jet is carried by the water into the water collection manifold.

The water jet preferably passes through the conveyor from above but it can still be operated along a horizontal return path of the conveyor (in which the pockets of the conveyor are effectively upside down) provided a suitable platform is provided below the upended openings of the pocket so that the carrots cannot fall out, but water can still pass therethrough.

To this end, where water jets are used, the platform is preferably apertured or formed from a mesh or perforated plate at least in alignment with each water jet so as to allow the water to pass therethrough.

Where saw blades are employed, whether circular elongate or of a bandsaw type, the platform needs to be apertured in the appropriate position to allow the saw blade to extend therethrough. Typically slits are formed in the platform in alignment with the blade positions to accommodate either a protruding section of a saw tooth edged disc or the elongate blade of a saw tooth edged bandsaw or the oscillating blade of a jig saw.

It will be appreciated that a platform below the inverted pockets must be positioned accurately relative thereto particularly where the pockets extend in a continuous manner across the width of the conveyor and must not be engaged by a saw blade edge itself associated with the platform.

It is however important that any such platform can be raised or lowered relative to the underside of the pocket conveyor for cleaning and maintenance and to enable the saw blades to be checked and set. Additionally, transversely extending drive belts for shifting the carrots to the left and to the right respectively need to pass across the platform and may be received in part in shallow rebates in the surface of the platform. Again, both for cleaning, maintenance and repair and setting up of these belts, it is important for the platform to be capable of being lowered away from the pocket conveyor with which it cooperates to keep the carrots in place.

Typically the platform is generally rectangular in shape when viewed in plan, and support means is provided at each of its four corners, each of the supports being attached to the machine frame and being extendible and retractable relative to the frame so as to raise and lower the platform, and drive means associated with each of the said support means effects the said raising and lowering. Control means may be provided to determine the operation of the drive means to effect the raising and lowering of the platform so that the latter can move to precisely the correct height relative to the pocket conveyor and can be lowered to a lower position well clear of the pocket conveyor for setting up, servicing, maintenance and repair purposes.

Preferably one or more sensors are provided for determining the position of the platform relative to the machine frame and the drive means is positively arrested in response to a signal from the sensing means which is generated when the platform reaches a given height.

Preferably stop means is also provided to prevent the platform being elevated beyond a second height which is slightly above the said given height, to prevent the platform being pushed into complete engagement with the pocket conveyor in the event of a failure by the sensor or control mechanism to arrest the movement of the drive means and the platform.

The drive means may include a slipping clutch or other torque limiting means to prevent damage to the machine in the event that the platform is driven into contact with the stop means.

The drive means may be pneumatic or hydraulic and in that event the pressure within the cylinders driving the platform in an upward or downward manner may be sensed and valve means provided to relieve the pressure in the event that the pressure exceeds a given level. In this way as soon as the platform is prevented from further movement, the immediate elevation of pressure within the ram or drive effecting the movement of the platform will cause the valve means to open and the pressure to be relieved. Where compressed air is used as the fluid medium, the valve means may simply vent to atmosphere. Where a hydraulic circuit is employed, the valve means simply vents the surplus oil to a vented reservoir.

A preferred drive means comprises four screw jacks each controlled by a rotary drive and gearbox. Synchronous rotation is preferably achieved through a mechanical linkage. Alternatively stepping motors may be used and/or servo controlled motors to achieve synchronous rotation.

The transversely extending drive belts for shifting the carrots first to the right and then to the left or vice versa, are preferably ribbed transversely. Typically the ribs have a relatively sharp edge extending transversely across the belt and therefore in line with the movement of the carrots relative to the belt but presenting a relatively blunt drive transmitting edge or paddle to the carrot transverse to the direction of movement of the carrot in the pocket conveyor therefore tending to grip the underside of the carrot and move the carrot reliably in one direction or the other. As soon as the carrot comes to a stop at one end or the other of its pocket, depending of course on the direction of movement of the drive belt, the continued movement of the drive belt against the edge of the carrot merely causes an effective machining of the carrot which since the latter will tend to be rotating relative to the drive belt can be used to remove the actual skin of the carrot. This will have a cleaning effect on the carrot.

It is of course important that any build-up of carrot skin on the drive belt is removed and to this end rotary brushes and/or a water wash or both may be provided, typically on the underside of the belt to remove unwanted build-up of vegetable matter thereon.

Where saw blades are the preferred form of cutting tool, and are mounted at spaced apart intervals across the width of the pocket conveyor the blades are preferably mounted on a single driving shaft itself supported in bearing assemblies mounted on the platform and according to a preferred feature of the invention, two or more drive shafts with cutting blades located thereon may be provided associated with each cutting position along the platform, and movable so that one or another of the different sets of blades can be moved into a cutting position. Drive means may be provided for effecting the movement of the different sets of blades and the substitution of one with another.

In a preferred arrangement, a first set of saw blades on a first drive shaft are located downstream of the first transversely extending drive belt, and a second set of saw blades on a second drive shaft are located downstream of the second drive belt, the saw blades on each drive shaft being aligned with grooves in the pocket walls at the ends of the pockets to effect the topping and tailing of carrots contained therein. A third drive shaft is movably mounted relative to the platform having mounted thereon saw blades which will segment the cut lengths of carrot when elevated relative to the platform into a cutting position. Means may be provided for raising and lowering the said third drive shaft and saw blades so that segmentation of the carrots can be achieved when desired.

The last mentioned arrangement is not limited to a single movable drive shaft and saw blades for segmenting the carrots but also envisages the use of two or more drive shafts with different numbers of saw blades mounted thereon, the different spacings and numbers of blades on each said shaft allowing the segmentation of the carrots into halves or quarters or other multiples thereof.

It is of course necessary to provide an appropriate number of grooves in the platform and the walls of the carrot containing pockets so that the cutting blades can pass there-through.

In another arrangement, the drive shaft carrying the blades instead may be readily demountable from the platform when not required to enable a substitute drive shaft with saw blades mounted thereon to be located in its place.

The drive shafts and cutting blades thereon may be independently driven by drive means which itself remains in place independently of whether the drive shaft(s) have been mounted thereto and independently of the drive shaft fitted, or a common drive to the shafts may be provided. Rotary drive transmitting means may be provided associated with one end of each shaft mounting, for transmitting rotary drive to a drive shaft fitted thereto.

The invention not only lies in a machine as aforesaid incorporating any one of the aspects and features of the invention as aforesaid but also in any combination thereof.

The invention also lies in an alternative design of machine in which the transverse endless belts are located above the horizontal section of the endless pocket conveyor in which the pockets face upwards. The saw blades may be mounted above the same section of the conveyor so that the severed lengths of carrot are all contained within the pockets and a guard or shield is provided preventing the severed lengths of carrot from leaving the pockets as the conveyor changes direction, and platform means is provided at selected positions across the width of the conveyor after the latter has changed direction and been inverted so as to selectively allow the cut ends and the cut lengths of carrot to fall into collecting bins or onto conveyors therebelow. Alternatively the saw blades may be mounted below the conveyor as previously described.

An arrangement in which the cutting is performed on an upper traverse of the pocketed conveyor and the separation of the cut lengths is performed on the lower return path of the same conveyor provides a further advantage in that the overall length of the machine can be reduced since in previous designs of the machine, the cutting and separation has been performed in tandem on the return path. By performing the cutting above and the separation below, the overall length of the machine is capable of being reduced.

It is to be understood that where cutting is performed on carrots lying in upwardly open pockets of the conveyor, it may still be necessary to provide a plate in the form of a downwardly facing platform above the open pocket in the upper traverse of the pocket conveyor so as to ensure that the carrots are retained in position in the pockets whilst they are being cut and to provide a backing for transversely extending drive belts which engage the pocketed carrots to cause them to shift to one end and the other of the pockets as previously described for end removal.

According to a particularly preferred aspect of the invention, the shifting of the carrots within the pocket can be effected as just described by appropriately directed transversely moving endless belts engaging the upper surfaces of the carrots in the pockets as they traverse a first path in the machine and the cutting and separation of the cut pieces can be performed on the underside of the conveyor over a return path after the latter has changed direction in the manner already described. Separation of the segments and cut ends of the carrots can be achieved in the region of the cutting blades and to this end a machine designed in accordance with this aspect of the invention can be compressed into a very small overall length.

On the other hand where length is not important the invention also envisages an alternative design of machine which includes much less moving parts and obviates above all the need for the transversely extending drive belts which can introduce considerable wear and tear and do involve very careful setting up of the machine.

According therefore to another aspect of the invention, a carrot topping and/or segmenting machine comprises a pocketed endless conveyor belt adapted to receive carrots and align same in the pockets so as to carry forward a monolayer of carrots within the pockets, first belt twisting means so as to lower one edge and raise the opposite edge of the belt so that the plane of the belt is now inclined to the horizontal causing each carrot to slide to one end of its pocket, cutting means cooperating with the pockets in the belt to sever the lowermost region of each carrot from the remainder of the carrot in each of the pockets as the belt progresses past the cutting means, second belt twisting means for reversing the orientation of the belt by twisting the belt so that the pockets are now angled in the opposite sense and the carrots are free to slide to the opposite ends of the pockets, second cutting means cooperating with the conveyor pockets to sever the other ends of the carrots from the remainder thereof, third twisting means to twist the belt into its normal mode in which the pockets are uppermost and the plane of the belt is substantially horizontal, each conveyor direction changing means around which the belt passes to allow the contents of the pockets to be discharged. Typically a platform below the belt has openings therein to allow the contents of the pockets selectively to drop out into bins or onto conveyors, to separate carrots from cut ends.

If segmentation of the carrots is required, additional cutting blades may be provided either at one or other of the cutting stations already mentioned or to interact with the carrots after the second cut has been performed.

Typically the belt is inclined through an angle of 45° but it is to be understood that the belt could be twisted through any desired angle including up to 90° so as to better ensure that the carrots will drop from one end of the pockets to the other. However it is to be appreciated that the greater the twist, the greater will be the length over which the belt has to pass to effect and reverse the twist and revert the belt once again to its normal plane after the second cutting.

In order to ensure that the carrots do not fall out of the pockets even if the belt is only twisted up to approximately 45°, a guard is preferably placed over the belt so that as the belt is twisted the open faces of the pockets and the carrots therein are caused to come close to a smooth surface angled in the same way as the belt over that section of its path, so that if the carrots try to leave the pockets they immediately come into contact with the smooth face of the guard plate and are retained in position in the pockets. The guard may be a more complex arrangement involving rotating brushes or rollers or separate plates. However the principle remains the same.

A guard plate is preferably provided wherever the belt changes direction and/or does not occupy a normal horizontal mode with the pockets uppermost.

According to a preferred feature of this aspect of the invention, means may be provided for subjecting the belt to an edgewise impact force once the belt has achieved the inclined position at which the carrots can slide from one end of the pockets to the other, and the direction of the force and the timing of the impact is such as to encourage carrots to slide from one end of the pockets to the other as a result thereof.

It will be seen that a machine in which the belt is merely twisted over its length and no transverse conveyors are required, is essentially a much simpler machine to operate and requires less power. By using a single endless belt all of the advantages of the high throughput of a single endless pocket conveyor belt are obtained without the complexities associated with transversely extending endless belts for shuttling the carrots within the pockets.

BRIEF DESCRIPTION OF THE DRAWINGS

The invention will now be described by way of example with reference to the accompanying drawings, in which.

DETAILED DESCRIPTION OF DRAWINGS

Figure 1:
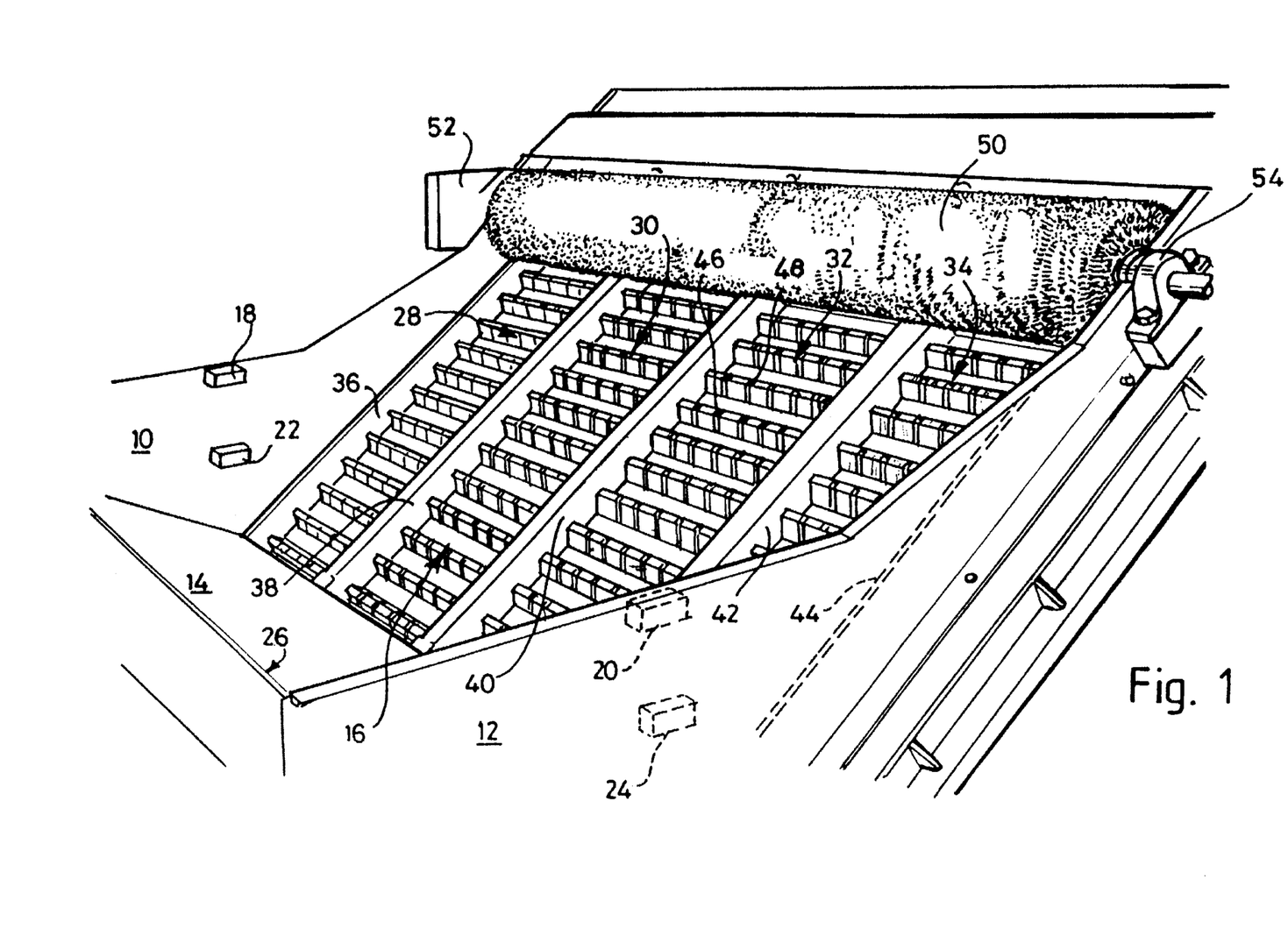
FIG. 1 is a perspective view of the input end of a carrot processing machine adapted to top and tail and if required, cut carrots into segments.

In FIG. 1 the two side cheeks 10 and 12 together with an inclined front wall 14 and an elevating conveyor 16 define a trough into which carrots can be deposited from a delivery conveyor (not shown). Sensing means at 18 and 20 is provided to determine if the heap of carrots in the trough exceeds a given height and further sensing means at 22 and 24 determines if the heap of carrots falls below a given level. Signals from the sensing means 18 to 24 can be used to control the delivery conveyor (not shown) and thereby maintain a substantially constant head of carrots in the well.

The inclined wall 14 is hinged along its upper edge at 26 and is adapted to be angularly displaced relative to that hinge by means of a rotating cam or other drive mechanism (not shown) below the plate. In this way any carrots which tend to become lodged on the plate will be vibrated clear and back into the heap within the well.

The conveyor which forms the other inclined surface of the well is made up of flights containing four in-line pockets one line of which is denoted by the four pockets 28, 30, 32 and 34 respectively. Communication between the ends of the pockets is preferably (as is exit from the edge of the conveyor) by means of elongate runners 36, 38, 40, 42 and a fifth edge runner shown in dotted outline at 44 but otherwise not visible in FIG. 1.

The runners 36 to 44 need not in fact be attached to the pockets but can be stationary and the conveyor flights run below and the product walls lie between the runners.

Each of the traverse walls of the compartments making up the pockets is formed with pairs of aligned slits such as denoted by reference numerals 46 and 48, to allow the walls to pass between cutting blades (to be described) and located elsewhere in the machine.

Above the conveyor is located a rotary brush 50 which is driven by a chain drive encompassed within a chain guard 52. The shaft on which the brush runs is carried in bearings at both ends mounted on the frame of the machine and one of which is shown at reference numeral 54.

Figure 2:
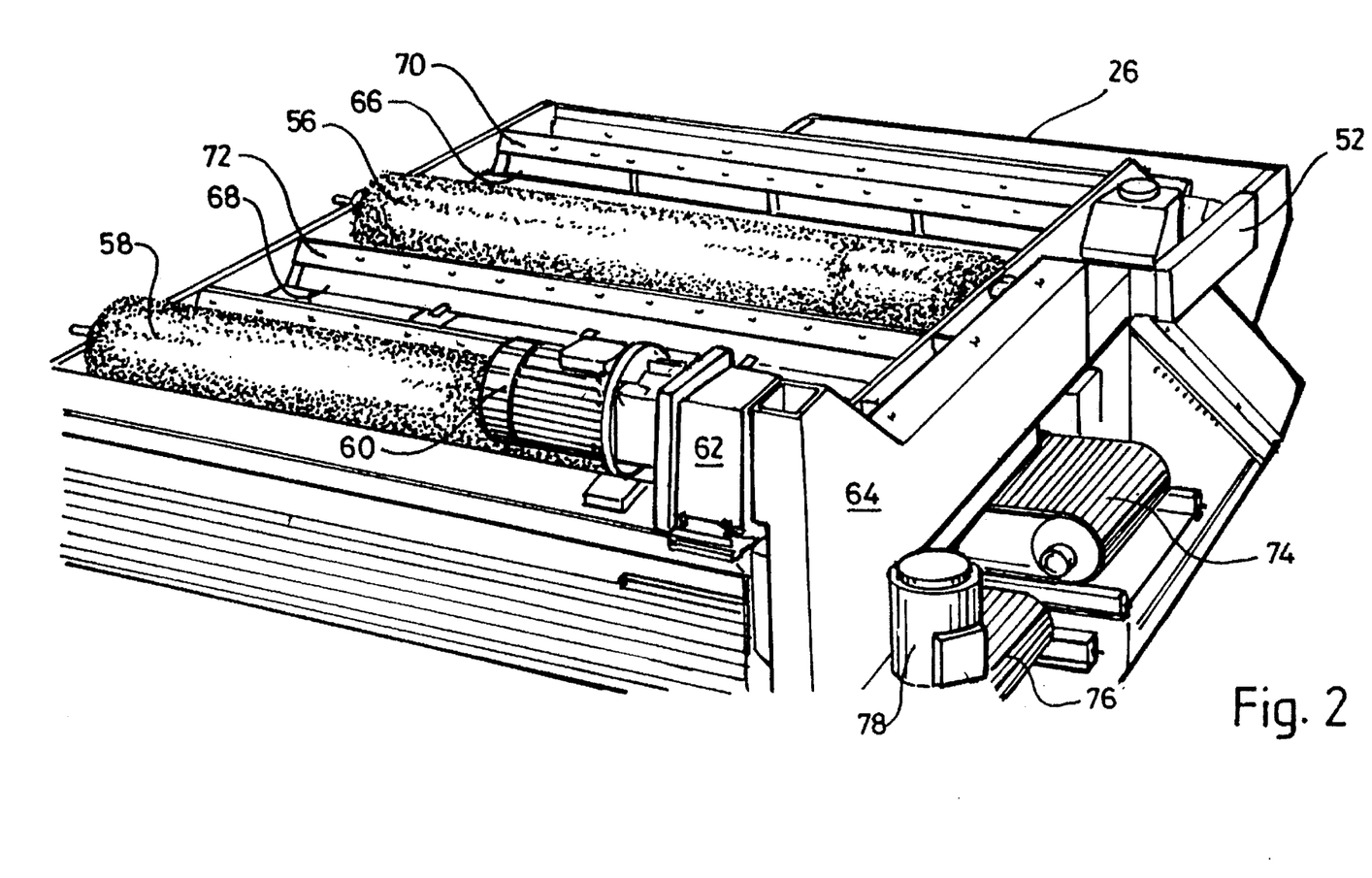
FIG. 2 is a top perspective view from the opposite corner of the machine shown in FIG. 1 looking across the top flight of the pocket conveyor.

At the top of the incline the conveyor passes in a continuous manner over a roller (not shown) to extend generally horizontally along the top of the machine. This is best seen in FIG. 2 which is a view of the top part of the machine from the opposite corner from that from which FIG. 1 is viewed.

It is of course important that any carrots carried by the conveyor occupy the compartments such as those designated by reference numerals 28 to 34 in FIG. 1 and to this end, rotary brushes are provided above the horizontal flight of the conveyor at 56 and 58. Drive for the brushes is provided by an electric motor 60 which drives a chain drive via a gearbox 62. The chain drive is contained within a housing 64 which communicates with the housing 52 already referred to. The same chain transmits drive to the first of the rotary brushes 50 which is located above the elevating section of the conveyor and which is visible in FIG. 1.

In addition to the brushes 56 and 58, two rubber flaps are located transversely across the conveyor flight at 66 and 68 respectively. Each is carried by a rigid bar 70 and 72 respectively and the depth of the flap is such that the lower edge just engages the carrots occupying the compartments. Should any carrot jump out of a pocket during the movement of the conveyor or per chance should any carrot have arrived at the top flight without having properly entered a pocket, it will be prevented from passing along the top flight of the conveyor and instead will come to rest in front of one or the other of the flaps and will simply lie there rolling against the flap as the other carrots in the pockets pass beneath it. If required any such carrots can be removed by hand by the machine operator whilst the machine is running or alternatively can be left until the machine has been stopped when any such carrots can be removed for reprocessing.

It will be appreciated that if the pocket occupancy is not 100%, empty pockets will occasionally pass below any such free carrots and there is a good chance that any such carrots will immediately drop into the empty pockets and be carried forward by the conveyor for topping and tailing. As a deliberate policy, the carrot feed to the machine can be interrupted periodically so as to run the conveyor empty for the purpose of collecting any such free carrots from the top flight.

FIG. 2 also shows the two endless belts 74 and 76 which are mounted so as to extend transversely below the underside of the horizontal return flight of the conveyor. The two belts 74, 76 are driven in opposite directions so that if belt 74 is moving from left to right, belt 76 is moving from right to left.

Figure 6:
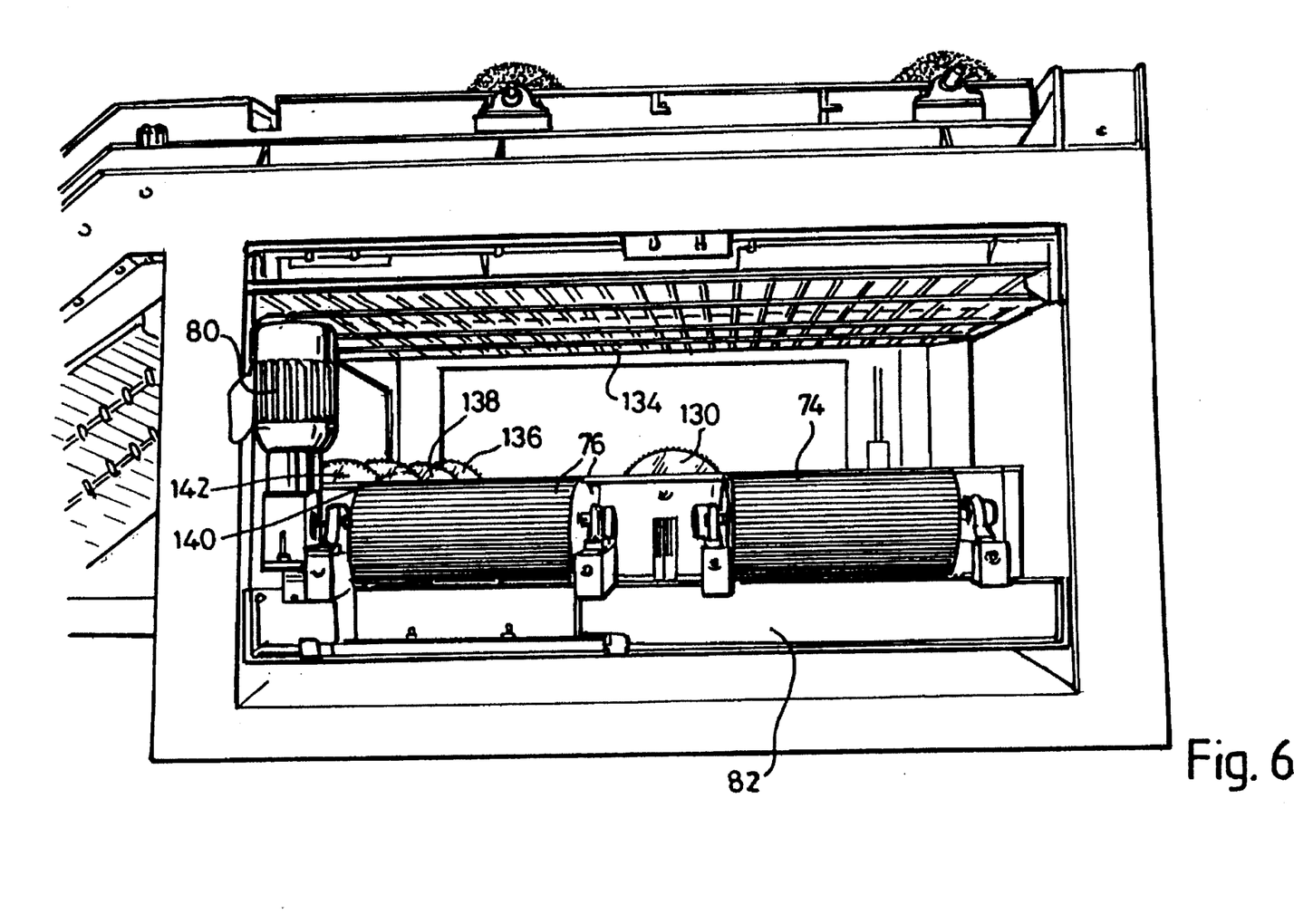
FIG. 6 is a side elevation of the machine shown in FIGS. 1 to 5.

Drive for the belt 76 is provided by an electric motor 78 and drive for the other belt is provided by a similar electric motor mounted at a diametrically opposite part of the machine relative to motor 78 and which can be seen at 80 in FIG. 6.

Figure 3:
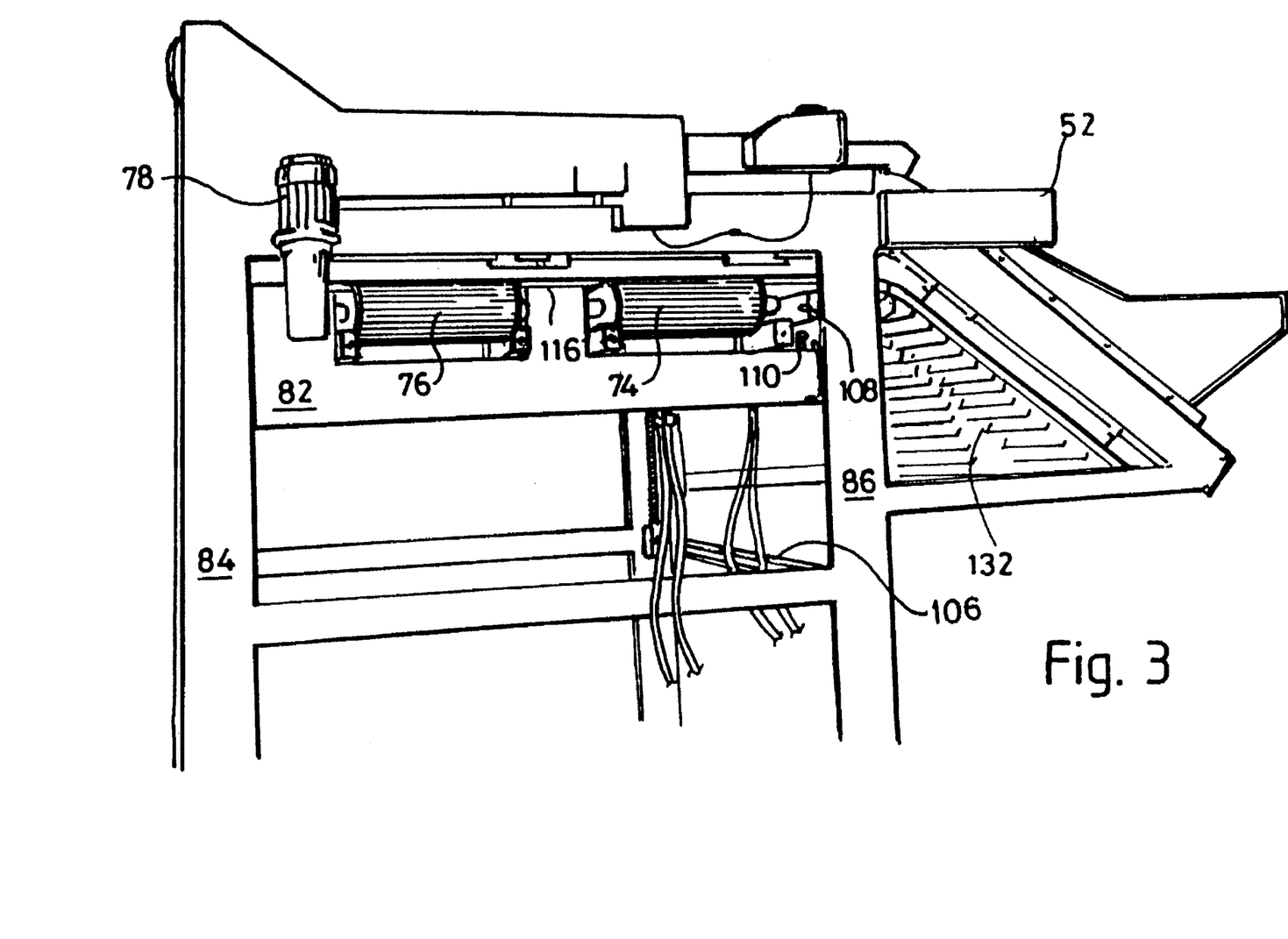
FIG. 3 is a side view of the machine shown in FIGS. 1 and 2 as viewed from approximately the same position as that of FIG. 2 but from a lower point relative to the machine.

FIG. 3 also shows the endless belts 74 and 76 this time in their elevated condition in which they actually engage the underside of the return flight of the conveyor for the purpose of engaging carrots constrained within the pockets to shunt the carrots first to one end and then to the other end of their respective pockets.

The two endless belts are carried on a platform generally designated 82 which can be raised and lowered within the overall machine frame, vertical upright members of which are denoted by reference numerals 84 and 86 in FIG. 3.

Figure 4:
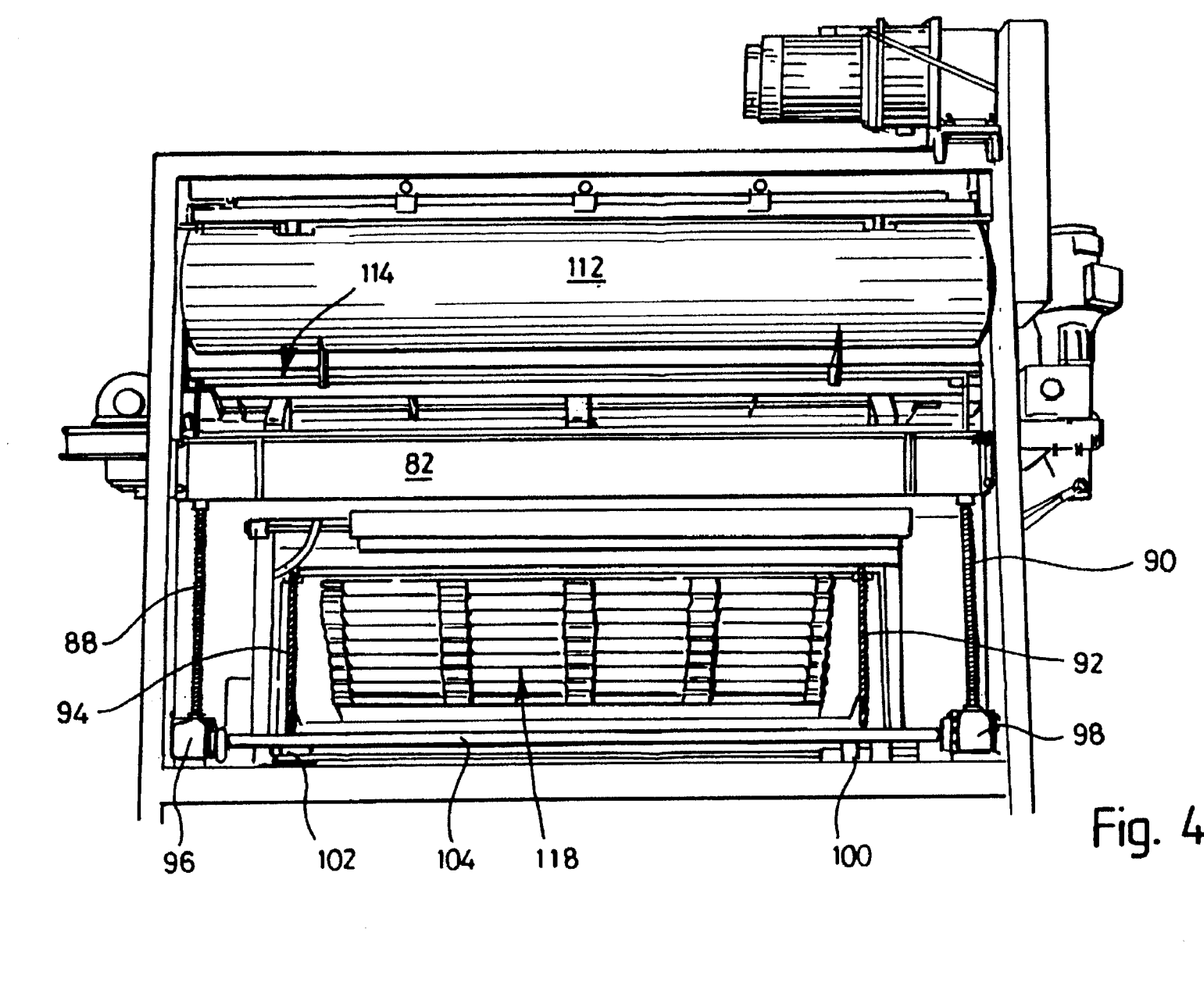
FIG. 4 is a view of the underside of the machine showing the underside of the elevating flight of the integral pocket conveyor and the platform which underlies the return flight of the conveyor below the upper flight shown in FIG. 2.

The mechanism for raising and lowering the platform is perhaps best seen in FIG. 4. Essentially this comprises four vertical threaded rods denoted by reference numerals 88, 90, 92 and 94. These threaded rods are arranged at the four corners of the generally rectangular platform 82 and are anchored to the platform at their upper ends. Rotating nut drives 96, 98,100 and 102 engage the threaded exteriors of the rods, and synchronous rotation of the drives causes the rods to move axially either up or down depending on the direction of rotation relative to the nut drives.

The nuts are in turn driven by interconnecting drive shafts one of which is visible at 104 in FIG. 4. A single electric, hydraulic or pneumatic drive (not shown) is provided for driving the interconnecting drive shafts such as 104 so that all of the nuts are driven by the same amount and in a synchronous manner to achieve the raising and lowering of the platform 82.

Another of the interconnecting drive shafts is shown at 106 in FIG. 3.

The upper position of the platform or table 82 is detected by a switch 108 (see FIG. 3) and to this end the platform 82 carries an adjustable stop 110 for engaging the switch actuator. The stop is adjusted so as to just trip the switch when the table 82 has reached the desired position at which the endless belts 74 and 76 occupy just the right height relative to the underside of the conveyor return flight to ensure that carrots occupying the pockets in the conveyor are retained therein and cannot fall out as they pass over the belts 74 and 76 but are also engaged by the surface of the belts so as to be shunted first in one direction and then the other transversely relative to the direction of movement of the conveyor.

In order to prevent carrots leaving the pockets as the conveyor changes direction as it passes around a roller (not shown) at the end of the top flight either of the path, a curved guard is provided at 112 (see FIG. 4) to encompass the conveyor flights as they pass around the roller (not visible) and provide a surface to trap carrots as the conveyor rotates around the roller (not shown).

The lower edge of the guard is extended around and into the machine as denoted by reference numeral 114 so as to provide a support surface on the underside of the conveyor to prevent the carrots from falling out from the now inverted conveyor flights until such time as the conveyor begins to pass over a large rectangular flat top of the platform 82, and denoted by reference numeral 116 in FIG. 3. The table top 116 is formed from a rigid sheet of metal and provides a backing surface for the endless belts 74 and 76 which are arranged to pass over the table top surface in opposite directions as previously described.

If desired, channels or rebates may be formed in the surface of the table 116 to accommodate the thickness of the belt.

Beyond the table top the inverted flights are exposed allowing carrots etc. to fall out and after passing around another direction changing roller (not shown) the conveyor descends parallel to the elevating section visible in FIG. 1 to extend around a bottom roller located below the well shown in FIG. 1 by which the conveyor changes direction once again to present the pockets to the carrots in the well to pick up the carrots, elevate them, and carry them around the machine.

Since the flights and pockets have become exposed as soon as they pass beyond the table top 116, any carrots and toppings remaining in the pockets can drop leaving the pockets clear for future use. The inverted and empty pockets are visible at 118 in FIG. 4.

Figure 5:
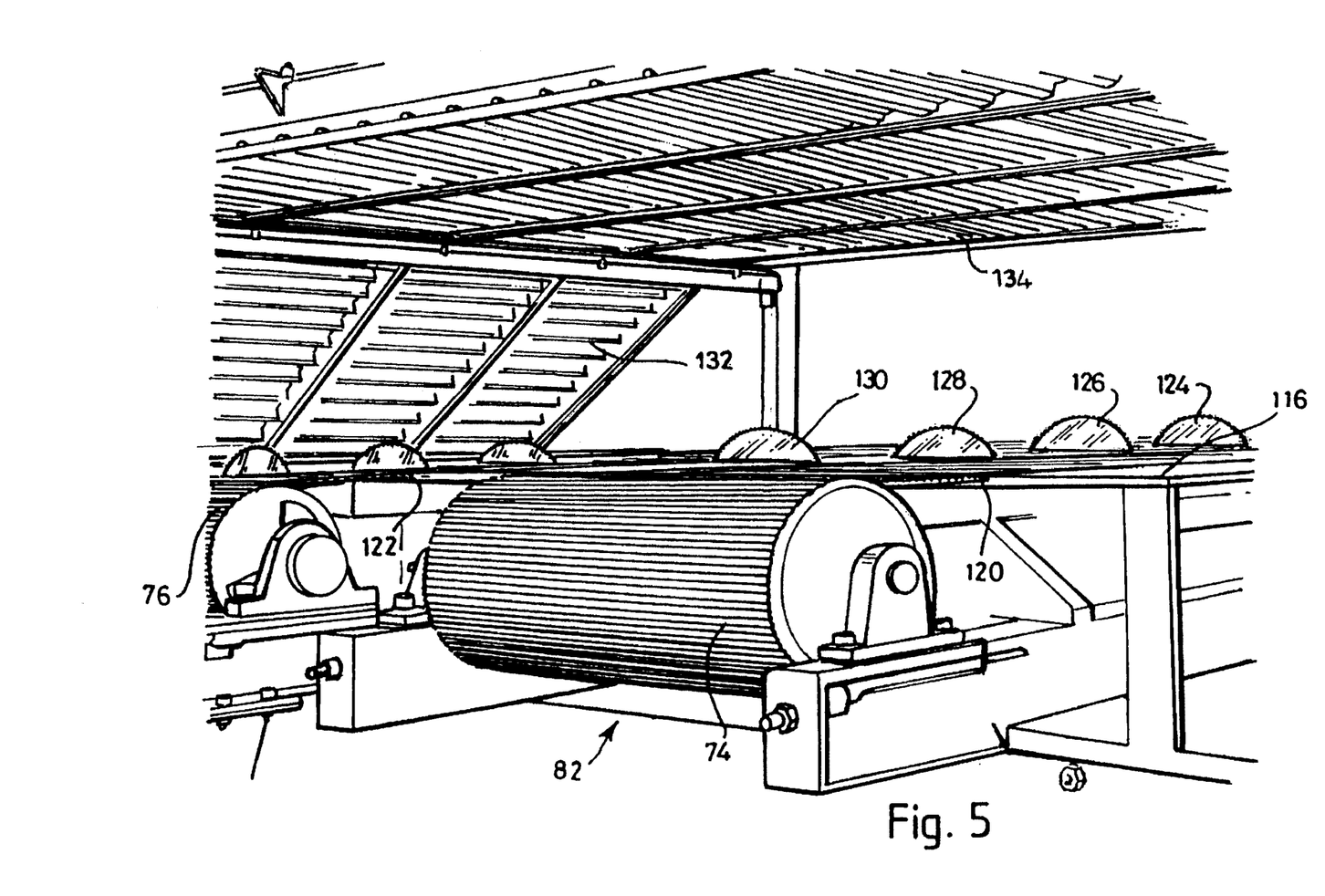
FIG. 5 is a close up view of the two transverse drive belts and the toothed cutting wheels carried by the platform which is movable into engagement with the underside of the pocket conveyor.

FIG. 5 shows to an enlarged scale the endless belts 74 and 76 and the table top 116. As can be seen, the table top is cut away at 120 and at 122 to accommodate the thickness of the endless belts so that the upper surface of the belt is essentially coplanar with the top of the plate or table top 116.

Rotary saw blades are located at intervals across the table top 116 which is formed with slits at appropriate positions thereacross to permit the blades to extend therethrough. The blades are denoted by reference numerals 124, 126, 128 and 130 in FIG. 5.

The blades visible in FIG. 5 are those which perform the first cut at one end of the pockets. As previously described the pockets include slits in the walls thereof to accommodate the blades 124 etc. and the blades are located downstream from the first endless belt 74. If the latter is moving from left to right as shown in FIG. 5, the carrots will all be shunted to the right hand ends of their pockets and the blades 124 etc. are therefore located towards the right hand ends of the pockets for removing the right hand ends of the carrots.

A second set of blades similar to 124 to 130 is located beyond the second endless belt 176 to similarly extend upwardly through the table top 116. This time the blades are positioned so as to be aligned with slits in the pocket walls to the left hand ends of the pockets, for removing the left hand ends of the carrots. To this end the belt 76 rotates in an opposite sense to that of 74 so that before the carrots are presented to the second line of cutting blades they have been shunted to the left hand ends of their pockets.

The table top may be apertured beyond the second line of cutters to allow further cutting blades to protrude therethrough for the purpose of segmenting the cut lengths of carrot. Alternatively additional blades may be mounted on the same rotary drive shaft (not shown) on which the second line of cutting blades are mounted (not shown in FIG. 5) so as to provide for segmentation of the carrots.

Each drive shaft (not shown) carrying the saw blades such as 124 to 130 is adjustable in height relative to the table top 116 and to advantage may be rendered readily demountable to allow a different set of saw blades to be quickly fitted to the machine. Alternatively (not shown) the drive shafts and cutter blade assemblies may be arranged so as to be movable into an operating position (such as that shown in FIG. 5 for the blades 124 etc.), and into a demounted inoperable position (not shown) in which the saw blades are removed clear of the table, to permit another drive shaft and set of rotary blades to be positioned in the working position, with the blades protruding through the table top 116 as shown. The transposition of one set of saw blades for another may therefore be effected automatically by the machine in response to an appropriate command signal typically provided by the operator.

FIG. 5 shows the table top and platform 82 in the lowered position (whereas FIG. 3 shows the platform in the raised position) relative to the conveyor. As a consequence FIG. 5 reveals the underside of the pocket conveyor and shows the flights containing the pockets as they are passing below the top deck of the machine in the horizontal return path before the conveyor changes direction around the penultimate roller (not shown) to move as shown at 132 in a generally downward and inclined manner as previously described. This section of the flight path can also be seen in FIG. 3.

FIG. 6 has already been referred to. This shows the platform 82 in the lower position and reveals the underside of the pocket conveyor as shown at 134 already referred to and visible in FIG. 5. FIG. 6 has been included previously to show the second line of rotary saw blades 136 to 142. However it also shows the mountings for the rollers around which the endless belt 74 and 76 pass and by which they are driven, and the slideways on which the bearing assemblies for the rollers by which the bearing assemblies can be positioned relative to the frame 82 for tensioning the endless belts.

What is claimed is:

1. A carrot processing machine comprising an accumulation well for receiving carrots, an elevating conveyor for elevating the carrots to an upper position and a pocket conveyor with pockets for receiving the carrots, wherein the elevating convey is constructed integrally with the pocket conveyor and at least one rotating brush is located above, so as to extend across, the elevating section of the pocket conveyor, so that in use the pocket conveyor picks up carrots from the accumulation well, the carrots are constrained to lie in the pockets and are aligned therewith, as they are transferred to the said upper position within the machine, and wherein a delivery conveyor cooperates with the accumulation well to deliver carrots thereto, height sensing means associated with the well determines the height to which carrots have accumulated in the well and speed control means for the delivery conveyor is operated in response to signals from the height sensing means to stop, decelerate, restart and accelerate as required the delivery conveyor so as to maintain the height of the carrots in the well substantially constant.

2. A carrot processing machine according to claim 1, wherein the pocket conveyor forms one wall of the accumulation well and extends from the base of the well at a steep angle to the horizontal, so that carrots picked up in the pockets and aligned by the movement of the pocket conveyor relative to the mass of carrots occupy and remain in the pockets in the conveyor at an early stage in their transportation so that very few carrots are carried out of the well other than in the pockets.

3. A carrot processing machine according to claim 1, wherein carrot alignment means is provided upstream of the exit point of the delivery conveyor to the machine so that carrots entering the well are generally aligned with the pockets in the pocket conveyor.

4. A carrot processing machine according to claim 1, wherein the delivery conveyor possesses pockets to assist in aligning the carrots entering the accumulation well.

5. A carrot processing machine according to claim 4, wherein rotating brushes are located above the delivery conveyor to assist in retaining the carrots within the pockets therein.

6. A carrot processing machine according to claim 1, wherein the accumulating well associated with the elevating section of the integral pocket conveyor includes at least one vibratory element.

7. A carrot processing machine according to claim 1, wherein cutting means is arranged across the pocket conveyor comprising spaced apart cutters arranged in pairs, for cutting the carrots to length, with the distance between the cutters in each pair corresponding to the length of carrot required, and upstanding walls of the pockets are cut away in alignment with the cutters, the upstanding wall sections between the cut away regions thereof passing between the cutters.

8. A carrot processing machine according to claim 7, wherein appropriately directed transversely moving endless belts are provided to engage exposed surfaces of the carrots in the pockets as they traverse a first path in the machine, to shifting the carrots within the pockets, and cutting and separation of the cut pieces is performed during a return path, after the conveyor has changed direction.

9. A carrot processing machine comprising an accumulation well for receiving carrots, an elevating conveyor for elevating the carrots to an upper position and a pocket conveyor with pockets for receiving the carrots, wherein the elevating, convey is constructed integrally with the pocket conveyor and at least one rotating brush is located above, so as to extend across, the elevating section of the pocket conveyor, so that in use the pocket conveyor picks up carrots from the accumulation well, the carrots are constrained to lie in the pockets and are aligned therewith, as they are transferred to the said upper position within the machine, wherein the accumulation well associated with the elevating section of the integral pocket conveyor includes at least one vibratory element, and wherein sensor means is provided across the width of the pocket conveyor, and signals are generated depending on the presence or absence of a carrot in each pocket to enable determination of a pocket occupancy percentage over a given sampling period.

10. A carrot processing machine comprising an accumulation well for receiving carrots, an elevating conveyor for elevating the carrots to an upper position and a pocket conveyor with pockets for receiving the carrots, wherein the elevating convey is constructed integrally with the pocket conveyor and at least one rotating brash is located above, so as to extend across, the elevating section of the pocket conveyor so that in use the pocket conveyor picks up carrots from the accumulation well, the carrots are constrained to lie in the pockets and are aligned therewith, as they are transferred to the said upper position within the machine, wherein cutting means is arranged across the pocket conveyor comprising spaced apart cutters arranged in pairs, for cutting the carrots to length, with the distance between the cutters in each pair corresponding to the length of carrot required, and upstanding walls of the pockets are cut away in alignment with the cutters, the upstanding wall sections between the cut away regions thereof passing between the cutters, and, wherein the cutting means is located along a horizontal return path of the pocket conveyor, over which the pockets of the conveyor are effectively upside down, and a platform is provided below the upended openings of the pockets so that the carrots cannot fall out.

11. A carrot processing machine according to claim 10, wherein the platform is movable relative to the underside of the pocket conveyor.

12. A carrot processing machine according to claim 10, wherein endless drive belts extend traversely across the platform for engaging and endwise shifting the carrots to one side or the other of the conveyor pockets.

13. A carrot processing machine according to claim 10, wherein the saw blades are mounted on at least one driving shaft itself supported in bearing assemblies mounted on the platform.

14. A carrot processing machine according to claim 13, wherein two or more drive shafts each having a set of saw blades mounted thereon, are provided at each cutting position along the platform, and are selectively movable so that one or another of the different sets of blades can be moved into a cutting position.

15. A carrot processing machine according to claim 14, wherein drive means is provided for effecting movement of the different sets of blades and the substitution of one set with another.

\* \* \* \* \*